(12) United States Patent
Hendrix et al.

(10) Patent No.: US 7,246,492 B2
(45) Date of Patent: Jul. 24, 2007

(54) PROGRESSIVE SOLAR BASED POWER GENERATING SYSTEM

(76) Inventors: John Perry Hendrix, P.O. Box 1008, Bluefield, WV (US) 24701; Mei Yun Hendrix, P.O. Box 1008, Bluefield, WV (US) 24701; Joshua Fong Hendrix, 1227 Lebanon St., Bluefield, WV (US) 24701

(*) Notice: Subject to any disclaimer, the term of this patent is extended or adjusted under 35 U.S.C. 154(b) by 728 days.

(21) Appl. No.: 10/792,204

(22) Filed: Mar. 3, 2004

(65) Prior Publication Data

US 2004/0182080 A1    Sep. 23, 2004

Related U.S. Application Data

(60) Provisional application No. 60/455,775, filed on Mar. 19, 2003.

(51) Int. Cl.
    *B60K 16/00* (2006.01)
(52) U.S. Cl. .................................. 60/641.8; 60/641.15
(58) Field of Classification Search ............. 60/641.8, 60/641.11, 641.15
    See application file for complete search history.

(56) References Cited

U.S. PATENT DOCUMENTS

| | | | | |
|---|---|---|---|---|
| 3,468,762 A | * | 9/1969 | Klitzsch | ................ 202/186 |
| 5,047,654 A | * | 9/1991 | Newman | ................ 290/52 |
| 6,062,029 A | * | 5/2000 | Doe | ................ 60/641.15 |
| 6,216,463 B1 | * | 4/2001 | Stewart | ................ 60/641.2 |

* cited by examiner

*Primary Examiner*—Hoang Nguyen

(57) ABSTRACT

An apparatus for converting solar energy to electrical energy and continue to generate electricity even when the solar radiation is not available by directing solar radiation to heating plates, which were mostly immersed in a steam generator to induce water temperature, and process water into steam which interacts with steam turbine and generator assembly to produce electricity. The remnant of the steam after steam to electricity conversion is captured by an elevated condensation collector, which is tilted with the lower side attached to a reservoir, the condensed steam descends into the reservoir, which is also elevated and attached by a water collecting system that collects rain and water from other sources. Water from the reservoir is released from the water chute at the base of the reservoir to the original elevation where it powers a water turbine and power, after electrical energy is extracted by generator assembly, the remaining water is recycled back into the steam generator for continuous solar energy conversion. A combustion chamber attached beneath the steam generator can be initiated using biomass or natural gas to ensure superheated steam production in the event that the solar radiation is unavailable or insufficient.

8 Claims, 4 Drawing Sheets

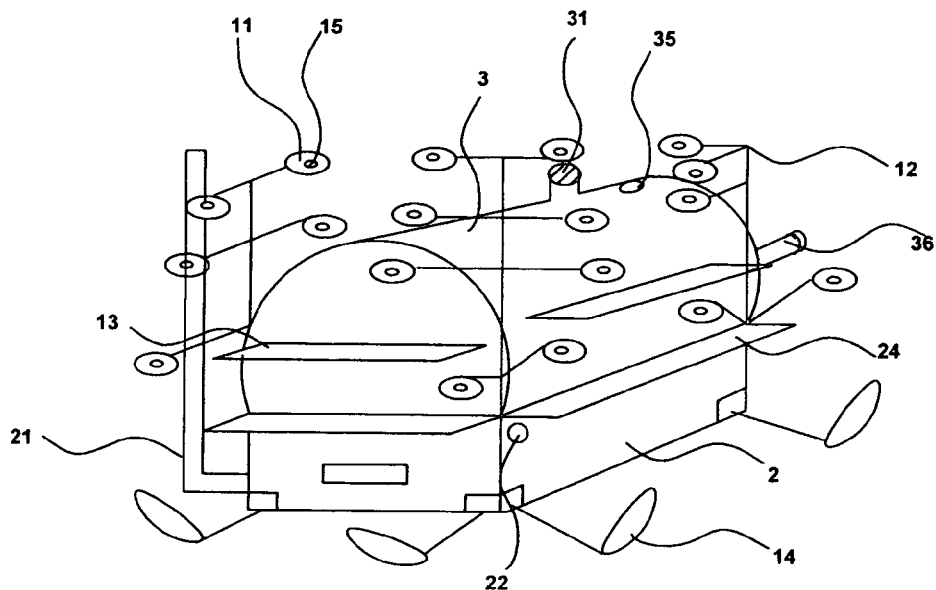
FIG. 2
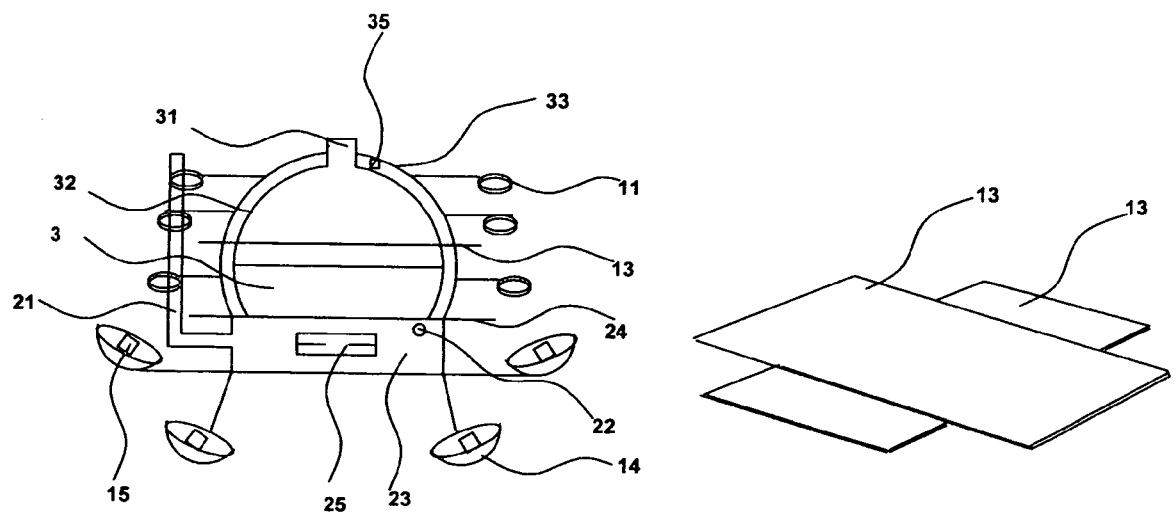
FIG. 3
FIG. 4

PROGRESSIVE SOLAR BASED POWER GENERATING SYSTEM

This application claims the priority of Provisional Patent Application No. 60/455,775, filed on Mar. 19, 2003, of which following is a specification:

BACKGROUND OF THE INVENTION

1. Field of the Invention

The present invention relates to an apparatus for continuous conversion of solar energy into electrical power, more specifically, to an apparatus which can direct solar radiation to a steam conversion device, to convert water into superheated steam, which is used to generate steam to rotary energy, thereby producing electrical energy, subsequently, remaining steam is captured by a condensation-collector and water collecting system, then directed to generate hydroelectric energy, and ultimately, is recycled back to the steam conversion device. A combustion chamber beneath the steam generator serves as a supplemental heating source and can be initiated when solar radiation is unavailable or insufficient to ensure the water-to-steam conversion. The process of concentrating solar energy to form superheated steam, thereby producing electricity, collecting condensation after steam energy conversion to generate hydroelectric energy, and then recycle the water back into the steam generator including heat reinforcement from the combustion chamber when solar energy is unavailable or insufficient, provides continuity for energy conversion, consequently, facilitates progressive electrical power generation.

2. Description of the Related Art

Various systems are available in the art of harnessing or using solar radiation to generate electrical power. The main disadvantage of these systems is that they can only function when the solar energy is available. Clearly, the solar energy is only available when the sun is present. Therefore, conversions from solar energy to electricity by these systems are often impeded when solar radiation is not available, or insufficient, thus, inconsistent.

While these systems in the art may be suitable for the particular purpose to which they address, they are not suitable for continuous energy conversion. Another problem with these systems in the art is that they are not capable of converting solar energy to both steam-to-rotary energy and hydroelectric energy.

In these respects, the apparatus of Progressive Solar Based Power Generating System according to the present invention, substantially departs from the conventional concepts and designs of the prior art, and in so doing provides an apparatus primarily developed for the purpose of continuously converting solar energy to electrical energy which overcomes the disadvantages of the prior art, and which is consistent, simple, and cost effective.

SUMMARY OF INVENTION

In view of the forgoing disadvantages inherent in the known types of solar-based power generating system now present in the prior art, the present invention provides an apparatus wherein the same can be utilized for generating electrical energy continuously even when the solar radiation is unavailable or insufficient.

The general purpose of the present invention, which will be described subsequently in greater detail, is to provide an apparatus of a new progressive solar based power generating system that has many of the advantages of the solar based power generator mentioned heretofore and many innovative features that result in an apparatus of a new progressive solar based power generator which is not anticipated, rendered obvious, suggested, or even implied by any of the prior art, either alone or in any combination thereof.

To attain this, the present invention generally comprises a steam-to-electrical energy converting system, a hydroelectric energy converting system, and a water-recycling tank. The steam-to-electrical energy converting system includes a steam generator for retaining water and producing steam, a solar collecting device with lens arrays that can be free standing or mounted in the housing to direct solar radiation to the exposed part of heating plates inserted in the steam generator, thereby transferring heat to remaining parts of the heating plates which are immersed in the steam generator to increase the water temperature, thereby converting water into steam, a combustion chamber for augmenting water-to-steam conversion when solar energy is insufficient or unavailable, a steam turbine and electric power generator assembly positioned in line with the steam generator to receive steam from the steam generator to generate mechanical rotary motion which is then converted into electrical energy. The hydroelectric energy converting system includes a condensation collector in line with the steam turbine for capturing the remnant of steam after the steam-to-electricity conversion, a reservoir, which is attached to the condensation collector, collects, filters and stores water from the condensation collector and from the water collecting system which is attached to the reservoir, a water turbine coupled with a power generator assembly below the reservoir for receiving the falling water released from the reservoir to generate mechanical rotary motion which is then converted to hydroelectric energy. A water-recycling tank which is placed beneath the water turbine, captures and stores the falling water from the turbine after the hydroelectric energy conversion and refills the steam generator when necessary.

There has thus been outlined, rather broadly, the more important features of the invention in order that the detailed description thereof may be better understood, and in order that present contribution to the art may be better appreciated. There are additional features of the invention that will be described hereinafter.

In this respect, before explaining at least one embodiment of the invention in detail, it is to be understood that the invention is not limited in its application to details of construction and to the arrangements of components set forth in the following description or illustrated in drawings. The invention is capable of other embodiments and of being practiced and carried out in various ways. It is to be understood as well that the phraseology and terminology employed herein are for the purpose of the description and should not be regarded as limiting.

It is a primary object of the present invention to provide a progressive solar based power generating system that will overcome the shortcomings of the prior art devices.

It is an object of the present invention to provide a progressive solar based power generating system for converting solar energy to both steam-to-electrical energy, hydroelectric energy, and supplemental biomass energy or natural gas as its only source of energy for providing electricity.

It is a further object of the present invention to provide a progressive solar based power generating system that is continuous, cost effective and environmentally sound.

To the accomplishment of the above related objects, this invention may be embodied in the form illustrated in the accompanying drawings, attention being called to the fact, however, that the drawings are illustrative only, and that changes may be made in the specific construction illustrated.

BRIEF DESCRIPTION OF DRAWING

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2 is a schematic view of the steam generator and combustion chambers with the solar collector.

FIG. 3 is a cross sectional view of FIG. 2

FIG. 4 is a diagram of the heating plates attached to the steam chambers.

DETAIL DESCRIPTION OF THE INVENTION

Figure 1:
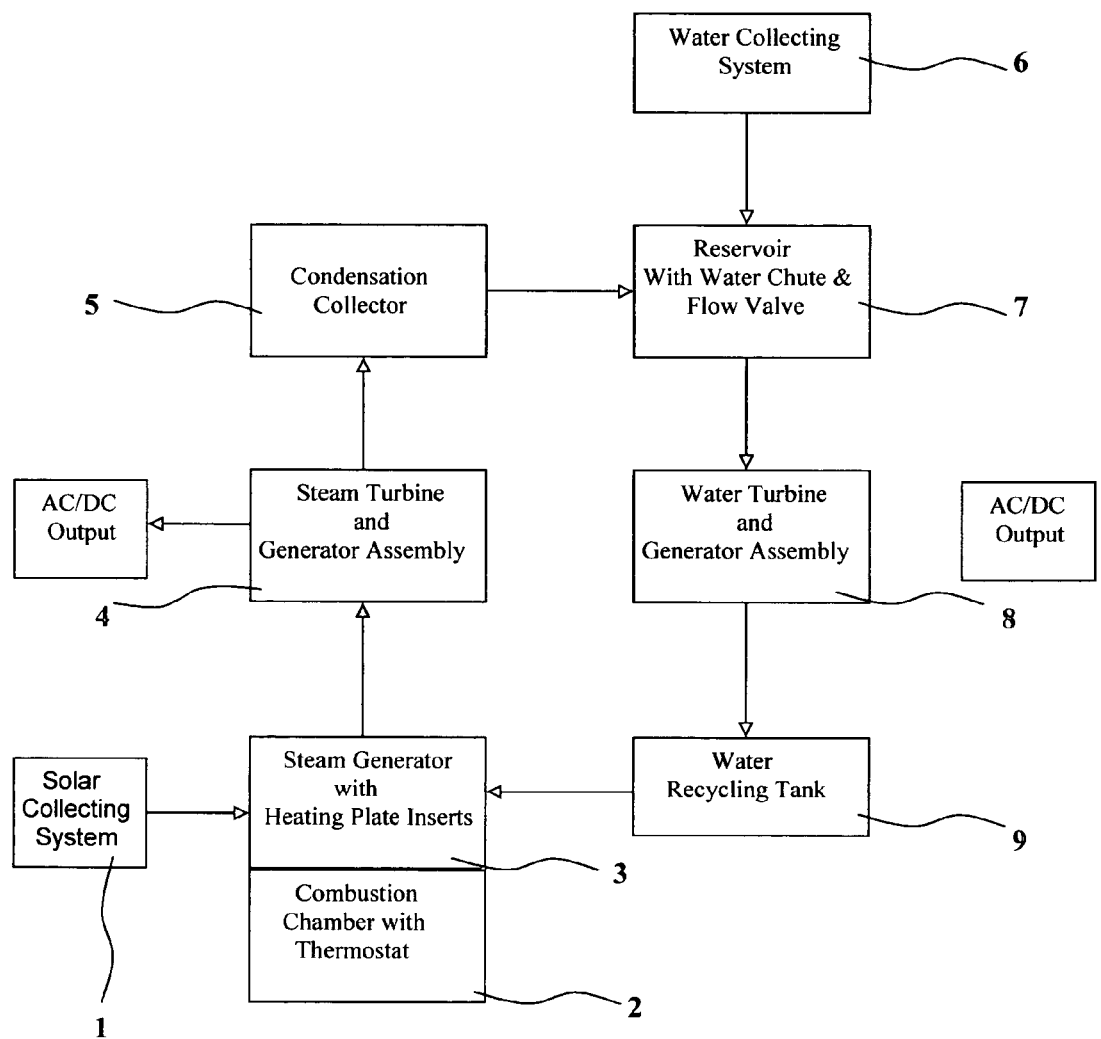
FIG. 1 is a perspective illustration of the present invention.

Turning now descriptively to drawings, in which similar reference characters denoted similar elements throughout the several views to designate the same components. FIG. 1 is a preferred embodiment of the apparatus of the current invention, which comprises a solar collector 1, for concentrating solar energy to steam generator 3 to produce superheated steam, a combustion chamber 2 for reinforcing the steam production when solar energy is insufficient, a steam turbine and generator assembly 4 for converting steam to electrical energy in a known manner, a condensation collector 5 for collecting leftover steam after steam-to-electrical energy conversion, a water collecting system 6 for collecting and filtering rain or water, condensed steam and water are both stored in a reservoir 7 and released to a water turbine and generator assembly 8 thereby converting water into hydroelectric energy in a known manner. The remaining water after the hydroelectric energy conversion is collected by a water-recycling tank 9 and redirected back to steam generator 3.

As indicated in FIG. 2, solar collector 1 includes bi-convex lens array 11, on 360° adjustable mount 12, can be free standing or attached to steam generator 3, with known servo control unit 15, is positioned to direct solar radiation to a focal point on the surface of heating plate 13 which is made of heat conductive material mostly immersed in the water of steam generator 3 with small parts of plate exposed outside the steam generator to receive solar radiation, parabolic mirrors 14 also driven by known servo control unit 15, are positioned to reflect the parallel light to a focal point on the bottom of the heating plate 13 to enhance the concentration of solar radiation, energy collected by solar collector 1 induce the temperature for heating plate 13 thereby increasing water temperature in the steam generator 3 to form superheated steam through the steam outlet 31, water supply pipe 36 receiving water refills from recycling tank 9. Combustion chamber 2 includes chimney 21 and thermal control 22, initiates heating function using biomass or natural gas to maintain superheated steam production when necessary.

With reference to FIG. 3, the steam generator 3 includes an internal vessel 32 incorporated with an external vessel 33 to form a chamber, which is positioned directly above the combustion chamber 2, an insulating material fills the vacuum section of the chamber to preserve the water temperature, a steam outlet 31, a pressure relieving valve 35. The combustion chamber 2 includes a chimney 21, a thermal control 22, a heating compartment 23 with a grill 25 covered by a dual function plate 24 which is made of heat conductive material to absorb and convey both solar radiation and supplemental heat from biomass or natural gas to induce the water temperature.

Referring to FIG. 4, heating plates 13, which are flat sheets made of rust-free and heat conductive materials with at least ¾ of the sheets immersed into the water in the steam generator 3 intersecting each other with space between the plates. A small part of each plate on two edges, which are parallel with each other, are exposed outside of steam generator 3 to absorb and convey solar radiation, thereby increasing water temperature in the said steam generator.

Figure 5:
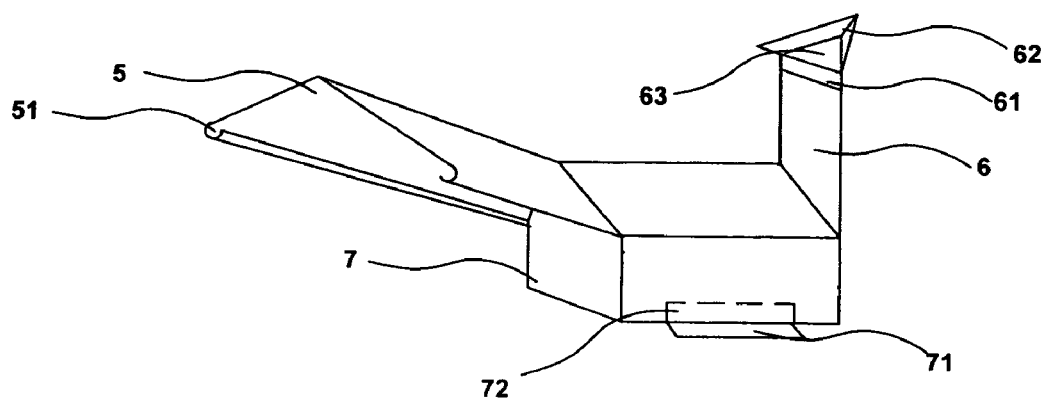
FIG. 5 is a perspective view of the condensation collector, reservoir, and the water collecting system.

As indicated in FIG. 5, condensation collector 5, a gable hood with adjoining trough 51 on each of the lower edges and horizontally angled with the lower part of the hood attached to the open end of reservoir 7, collects remnant of steam after steam-to-electrical energy conversion and delivers water from the condensed steam into reservoir 7. Water collecting system 6 is connected to the reservoir 7, including a funnel 62, coupled with a filter 61 and valve 63 to filter and collect rain, or water from other sources. Reservoir 7, a container with a gable roof that matches the hood of condensation collector 5, receives and stores water from both condensation collector and water collecting system. One end of the gable of the reservoir 7 receives water from condensation collector 5, the other end of the gable is connected to and receives water from the water collecting system 6. A water chute 71 with a flow valve 72 extended from the bottom of reservoir 7, releases water down to water turbine and generator assembly 8. Preferably, condensation collector 5, reservoir, and water collecting system are made of rust-free material.

Figure 6:
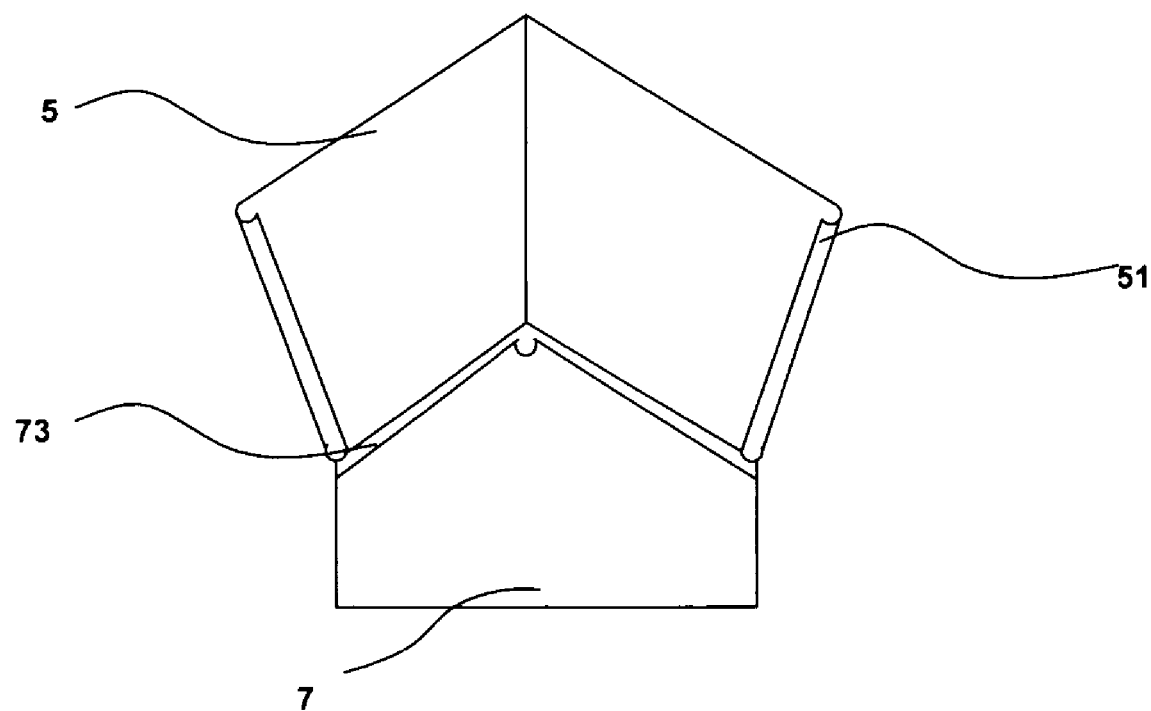
FIG. 6 is a front view of the condensation collector.

As shown in FIG. 6, the condensation collector is tilted approximately 40° horizontally with the lower end of the hood attached to the reservoir 7. When the steam is captured and condensed, it flows down to the opened slot 73 of the reservoir.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in specification are intended to be encompassed by present invention.

Therefore, the foregoing is considered as illustrative only of principles of the invention. Further, since numerous modifications and changes will readily occur to those who are skilled in the art, it is not desired to limit the invention to exact construction and operation shown and described, and accordingly, all suitable modifications and equivalents may be resorted to, falling within the scope of the invention.

We claim:

1. An apparatus for progressive solar based power generating system including in combination: a solar collecting system to concentrate and to direct sun radiation; a steam generator are held in place with said solar collecting system for holding water and producing superheated steam, includes an internal vessel incorporated with an external vessel to form a chamber, an insulated material fills the vacuum section between the internal and external vessels to preserve the water temperature, and, a set of heating plates inserted in the steam generator with small parts of said plates exposed outside of said steam generator to absorb and convey concentrated heat from solar energy thereby inducing water temperature and produce superheated steam; a combustion chamber directly beneath the steam generator for maintaining the superheated steam production using biomass or natural gas when solar energy is unavailable or insufficient; a steam turbine and electric power generator positioned to receive steam from said steam generator for producing a mechanical rotary motion and converting the mechanical rotary motion into electricity; a condensation collector for collecting and condensing the remnant of steam after steam to electricity conversion; a water collecting system with filter for collecting and filtering rain or water from other sources; a reservoir attached to both the condensation collector and water collecting system for storing and releasing water collected from said condensation collector and water collecting system; a water turbine and electric power generator assembly positioned beneath said reservoir to receive water for producing a mechanical rotary motion, and converting the mechanical rotary motion into electricity; water-recycling tank for collecting the remaining water after hydroelectric energy conversion and redirecting the said remaining water to said steam generator as needed.

2. The combination according to claim 1, wherein said solar collector includes arrays of bi-convex lenses and parabolic mirrors driven by servo control unit that reflect and magnify sun radiation to the exposed portion of said heating plates which are inserted in the water of said steam generator, thereby inducing water temperature in said steam generator to form superheated steam.

3. The combination according to claim 1, wherein said heating plates, which are sheets made of rust-free and heat conductive materials with large portion of the sheets immersed into the water in the steam generator intersecting each other with space between the plates, a small pan of each of said plate on two edges, which are parallel with each other, are exposed outside of said steam generator to absorb and convey solar radiation, thereby increasing water temperature in the said steam generator to form superheated steam.

4. The combination according to claim 1, wherein said combustion chamber attached to the base of said steam generator includes a chimney, a thermal control, a heating compartment with a grill, covered by a dual function plate which is made of heat conductive material to absorb and convey both solar radiation and supplemental heat, said combustion chamber initiates heating function using biomass or natural gas to maintain superheated steam production when necessary.

5. The combination according to claim 1, wherein said condensation collector in an elevated position includes a gable hood with adjoining trough on each of the lower edges and horizontally angled with the lower part of the hood attached to the open end of the reservoir, collects remnant of steam after steam-to-electrical energy conversion and delivers water from the condensed steam into the reservoir.

6. The combination according to claim 1, wherein said water collecting system is connected to the reservoir, including a funnel coupled with said filter and the valve to filter and collect rain, or water from other sources.

7. The combination according to claim 1, wherein said reservoir in the same elevation with said condensation collector, includes a container with a gable roof that matches the hood of said condensation collector, receives and stores water from both the condensation collector and the water collecting system, one end of the gable of the reservoir receives water from said condensation collector, the other end of the gable is connected to and receives water from the water collecting system, a water chute with a flow valve extended from the base of reservoir, releases water down to its original elevation where water turbine and generator assembly are positioned, said condensation collector, the reservoir, and the water collecting system are made of rust-free material.

8. The combination according to claim 1, wherein said water-recycling tank is placed for receiving remaining water after hydroelectric energy is extracted and releasing water back into said steam generator as needed to start the cycle, includes supply piping, water pump coupled with said water-recycling tank.

* * * * *